United States Patent [19]

Takai et al.

[11] Patent Number: 4,619,693
[45] Date of Patent: Oct. 28, 1986

[54] SYSTEM USING ELECTRIC FURNACE EXHAUST GAS TO PREHEAT SCRAP FOR STEELMAKING

[75] Inventors: Kiyoshi Takai; Kiyoshi Iwasaki, both of Hyogo, Japan

[73] Assignee: Godo Steel, Ltd., Osaka, Japan

[21] Appl. No.: 721,461

[22] Filed: Apr. 9, 1985

[30] Foreign Application Priority Data

Jul. 23, 1984 [JP] Japan .................. 59-152300

[51] Int. Cl.$^4$ .................................................. C22B 4/00
[52] U.S. Cl. .......................................... 266/88; 75/10.1; 75/25; 75/44 S; 266/901
[58] Field of Search ............... 75/10 R, 25, 44 S, 11

[56] References Cited

U.S. PATENT DOCUMENTS

| 3,033,673 | 5/1962 | Collin | 75/11 |
| 3,365,340 | 1/1968 | Tisdale | 75/25 |
| 3,719,471 | 3/1973 | Jones | 75/25 |
| 3,756,804 | 9/1973 | Stevenson | 75/77 |

*Primary Examiner*—Peter D. Rosenberg
*Attorney, Agent, or Firm*—Lowe, Price, LeBlanc, Becker & Shur

[57] ABSTRACT

Dust containing high-temperature gas exhausted from an electric steelmaking furnace is directed through scrap preheaters, wherein scrap that is to be charged into said electric furnace is preheated. The absorption of some of the heat from the exhaust leaving the electric furnace by the scrap, therefore, decreases the amount of electric power required for melting the steel scrap and also shortens the time required for steelmaking. Exhaust gas after preheating of the scrap is contaminated with incidental malodorous materials, e.g., paint and oil fumes, and is directed through a gas scrubber followed by a wet-type electric precipitator to remove these contaminants before release of cleaned exhaust gas into the atmosphere. A flow of alkaline aqueous solution of a deodorant solvent in the gas scrubber removes malodorous substances from the exhaust gas, simultaneously causing a drop in the gas temperature to a predetermined controlled value while generating a constant supply of saturated water vapor. Exhaust gas mixed with the saturated water vapor then flows through a wet-type electrostatic precipitator which collects oil mist attached to the water vapor and any small water droplets entrained therein. This purging of dust and malodorous constituents from the exhaust gas facilitates preheating of scrap for electric steelmaking processes, providing benefits of improved economy and reduced environmental air pollution.

8 Claims, 9 Drawing Figures

SYSTEM USING ELECTRIC FURNACE EXHAUST GAS TO PREHEAT SCRAP FOR STEELMAKING

TECHNICAL FIELD

This invention relates to a system for cleanly preheating scrap for steelmaking, and more particularly, to a scrap preheating system using energy recovered from exhaust gas from an electric furnace that melts the scrap.

BACKGROUND OF THE INVENTION

The exhaust gas generated in the operation of an electric steelmaking furnace contains a large quantity of dust and recoverable thermal energy, or heat. This exhaust gas can be used to preheat scrap that is to be charged into the electric furnace, saving both time and electric power required for melting the steel. However, oil, paint, rubber or plastic are often attached to or mixed in with the steel scrap, and heating them generates malodorous gases and fumes. Typically, the temperature of the exhaust gas drops by about 100° C. to 300° C. as it provides heat to the scrap being preheated. Hence exhaust gas temperature reaching the scrap has to be in the range of 650° C. to 700° C. which is necessary to decompose the above-mentioned organic matter in the scrap. Failure to so decompose such pollutants results in the release of malodorous effluents into the atmosphere, causing unacceptable environmental pollution.

A scrap preheating system, like the one shown in FIG. 9, has been used to remove odors from furnace exhaust gas after preheating of scrap in order to prevent environmental air pollution. Such a system typically comprises a combustion apparatus 3, wherein combustibles such as carbon monoxide, which are present in the dusty exhaust gas from furnace 2, are burned. This eliminates such constituents from the exhaust gas and heats it. Thereafter, some of this exhaust gas is introduced at a high temperature to a scrap preheater, such as 71 or 72, so that some of the heat energy from the exhaust gas may be utilized to preheat the scrap therein. An induced draft fan 73 then returns the somewhat cooled gas, after it has heated the scrap, through circulation duct 74 to a gas feeding box 75 provided upstream of the combustion apparatus 3 so that this gas may be mixed therein with dusty, high-temperature exhaust gas from the electric furnace 2. Malodorous substances picked up from the preheated scrap are thereafter burned in combustion apparatus 3 together with the combustibles, thus obtaining deordorization of the finally released exhaust gas.

As indicated in FIG. 8, the temperature of the exhaust gas from the electric furnace, however, depends on the relatively low temperature that prevails during the initial melting of the scrap after charging up of the furnace, a temperature drop by air mixture under followup-charging, a higher temperature level during the intermediate melting thereafter, a temperature drop under refollowup-charging, and an even higher temperature during the final melt thereafter. The temperature of exhaust gas going through the furnace varies in the range of 400° C. to 1200° C. As a result, for the period during which the temperature of the exhaust gas is at the lower end of this range, the temperature in the combustion apparatus cannot be kept at 650° C. or higher, i.e., hot enough to deodorize the gas. In addition, since the gas in the combustion apparatus is reintroduced into the scrap preheater, much of the exhaust gas recirculates between the combustion apparatus and the scrap preheater, and this significantly decreases utilization of the available heat in the exhaust gas. In other words, since all the gas after preheating scrap is recirculated into the combustion apparatus in order to deodorize it, the heat energy of the exhaust gas as it comes from the electric furnace is not optimally used for preheating scrap. This eventually results in the release of malodorous effluents and lowers the overall efficiency in operating the system.

It was long believed that the gas after preheating scrap could not be deodorized without the offensive constitutents actually being burned. However, it has been confirmed by research leading to the present invention that the unpleasant odor generated by electric steelmaking furnaces is caused not only by ordinarily encountered malodorous substances other than oil but also by oil mist generated from cutting or lubricating oils that are present and mixed in with cutting scrap, etc., and that such materials have interaction effects that aggravate the malodorousness of each separate pollutant. From this viewpoint, in order to deodorize the gas after preheating scrap, it is necessary not only to remove the ordinarily encountered malodorous substances but also to separate out and collect the oil mist before released into the atmosphere. It is the purpose o the present invention to effect this in a practical system.

DISCLOSURE OF THE INVENTION

Accordingly, it is an object of this invention to provide a system for cleanly preheating scrap for steelmaking in an electric furnace, which makes optimum use of the available heat from the furnace exhaust gas and removes particulate and malodorous constituents from the exhaust gas after preheating of the scrap, thereby reducing environmental air pollution to acceptable levels for an electric steelmaking operation.

Another object of this invention is provide apparatus to achieve a reduction in both the time and the electric power needed for melting scrap in an electric steelmaking operation.

. Another object of this invention is to provide apparatus for the removal and separation of malodorous organic substances and oil mist present in exhaust gas used to preheat scrap for an electric steelmaking operation.

Yet another object of this invention is to provide a method for cleanly preheating scrap for steelmaking, using exhaust gas from an electric steelmaking furnace, which makes optimum use of the available heat in the furnace exhaust gas and removes particulate and malodorous matters from the gas after preheating the scrap, to reduce environmental air pollution to acceptable levels for an electric steelmaking operation.

A further object of this invention is to provide a method to reduce both the time and the electric power needed for melting scrap in a steelmaking operation.

An even further object of this invention is to provide a method for the removal and separation of malodorous organic substances and oil mist present in exhaust gas used to preheat scrap for an electric steelmaking operation.

These and other related objects of this invention are achieved by providing a combustion means for burning combustible constituents present in gas exhausted from an electric furnace while simultaneously separating out and collecting most of the larger particulate matter and dust contained therein. The hot exhaust gas is then passed through a scrap preheating means wherein scrap material is heated by transfer of thermal energy from the exhaust gas. The exhaust gas, having preheated the scrap, then passes to a dust collector for removal of most of the remaining dust therefrom, including any dust picked up from the preheated scrap. The gas thereafter passes through a gas scrubber means, for removal of odor-causing substances therefrom by interaction with a deodorant solvent in an aqueous solution, the flow rate of which is adjusted to match the gas temperature at the inlet of said scrubber. The mixing of solvent spray and the hot exhaust gas generates a continuous supply of saturated vapor. Small droplets of oil, generated from oil present in the preheated scrap, attach themselves to small water droplets and the saturated water vapor and are separated out by wet-type electric precipitation means. The deodorant solvent chemically removes other odor-causing constituents in the exhaust gas, whereby the exhaust gas finally released into the atmosphere is clean and substantially free of dust, malodorous constituents and oil mist which otherwise would interact to create very offensive effluents representing serious environmental pollution.

BRIEF DESCRIPTION OF THE DRAWINGS

The same numbers are used identify like elements, or parts of elements, in each of the drawings and for purposes of reference elsewhere in this application.

BEST MODE FOR PRACTICING THE INVENTION

Figure 1:
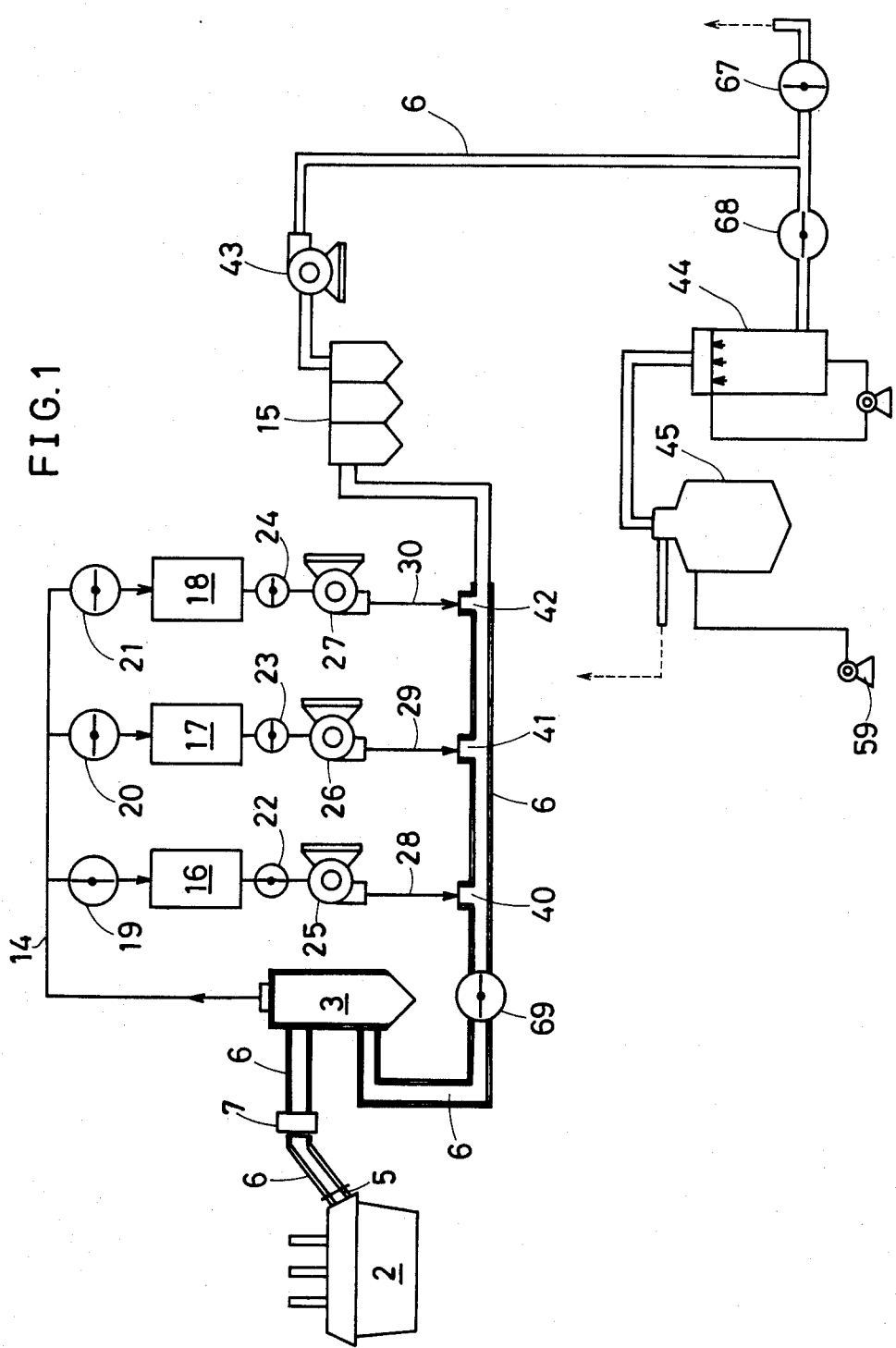
FIG. 1 is a systemic diagram of the scrap preheating and exhaust gas purification apparatus of the present invention.

Referring to FIG. 1, high-temperature exhaust gas containing entrained dust, generated during the operation of an electric steelmaking furnace 2, is burned in a combustion apparatus 3 so that all combustible constituents present in the exhaust gas are oxidized, i.e., burned, releasing more heat. The exhaust gas thereafter, in whole or in part, is supplied to scrap preheaters such as 16, 17 and 18, so that the thermal energy or heat present in the exhaust gas is utilized to raise the temperature of the scrap that is to be charged into the electric steelmaking furnace 2.

Main duct 6, into which the gas from the electric steelmaking furnace 2 is conveyed, is connected to a gas outlet 5 at the wall or ceiling of electric furnace 2, and is provided downstream thereof with a gap adjusting ring 7 and the combustion apparatus 3, in that sequence. A suitable quantity of fresh air is inhaled through the gap adjusting ring 7 to burn combustibles, e.g., CO, present in the exhaust gas and is fed through the combustion apparatus 3 mixed in with the dusty, high-temperature exhaust gas from electric furnace 2.

Figure 2:
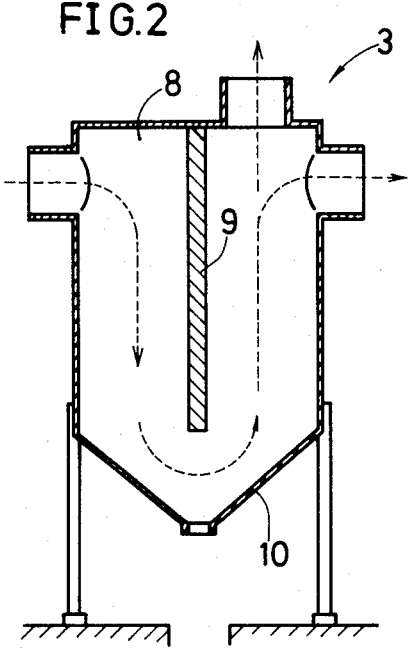
FIG. 2 is a sectional view of one embodiment of the combustion apparatus.
Figure 3:
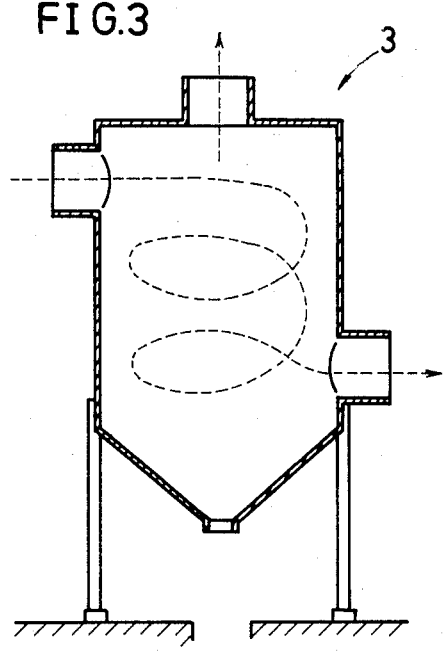
FIG. 3 is a sectional view of a cyclone type alternative embodiment of the combustion apparatus.

Combustion apparatus 3 is constructed to enable mixing of the dusty high temperature exhaust gas with the fresh air taken in at adjusting ring 7, for effective burning of the combustible constituents, e.g. CO, present in the exhaust gas. Combustion apparatus 3 is also shaped and designed to effectively separate out and collect most of the larger, relatively dense, particulate matter and dust from the exhaust gas passing therethrough. Referring to FIG. 2, combustion apparatus 3 has a combustion chamber 8 decreasing the exhaust gas flow velocity to promote the spontaneous combustion of any combustible constituents present, a partition plate 9 enabling the downward and then upward flow of the exhaust gas in the combustion chamber, and a dust hopper 10 under the combustion chamber. This change in direction of gas flow promotes separation of dust therefrom. In an alternative embodiment, shown in FIG. 3, the combustion apparatus 3 has the form of a well-known cyclone device for decreasing gas flow velocities and generating a spiral vortex of the gas flow therethrough. The vortex has the effect of creating centrifugal outwardly directed forces on the particulate matter entrained in the exhaust gas, thus facilitating its collection along the outward surfaces from which it falls below.

The upper portion of combustion apparatus 3 is connected to subduct 14 which feeds the gas through scrap preheaters 16, 17 and 18, after partial or complete combustion of the combustible constituents, and bypasses the main duct 6 which is directly connected to dust collector 15.

Figure 4:
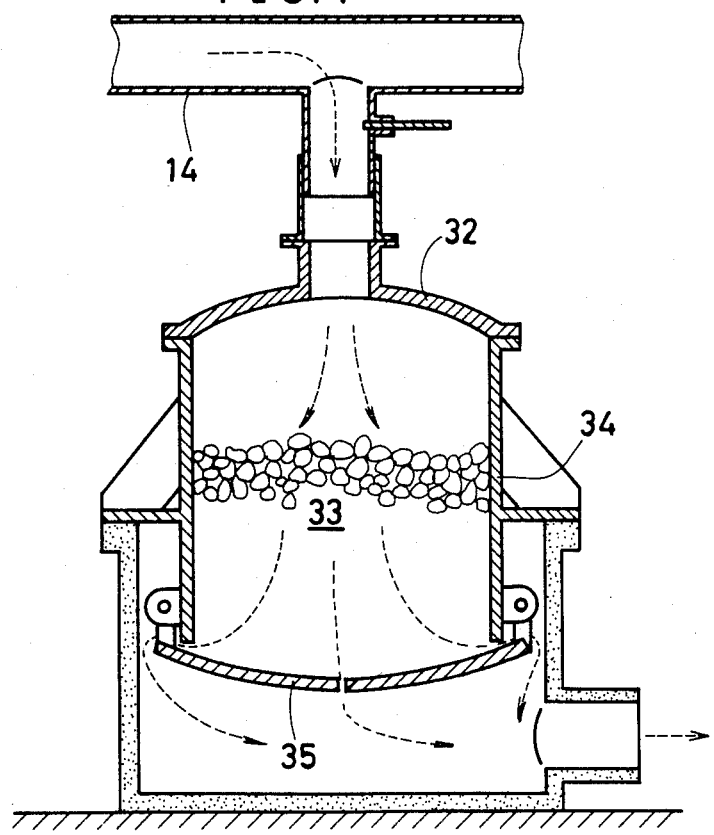
FIG. 4 is a sectional view of a scrap preheater.

The scrap preheating means comprises one or more scrap preheaters, such as 16, 17 and 18, disposed in series or in parallel as shown in FIG. 1, each connected to the subduct 14 through valves 19, 20 and 21 respectively. Referring to FIG. 4, a scrap preheater includes an upper cover 32 which opens in order to allow deposition of a charge of scrap 33 therein, a cylindrical body 34 for holding the scrap, and a bottom cover 35 of clam shell design which holds in the scrap until cover 35 opens to allow charging of the preheated scrap into the electric furnace 2.

Valves 22, 23 and 24 connect scrap preheaters 16, 17 and 18 to booster fans 25, 26 and 27, respectively, provided at exhaust ducts 28, 29 and 30 downstream of the preheaters, so that the exhaust gas with its malodorous constituents and oil mist may be conveyed through ducts 28, 29 and 30 into the main exhaust duct 6. Naturally, by appropriate closure of valves, one or more of the scrap preheaters 16, 17 and 18 may be used simultaneously.

Downstream of the junctions 40, 41 and 42, of main duct 6 and exhaust ducts 28, 29 and 30 respectively, is provided a dry-type dust collector 15, such as a bag filter, for collecting the residual dust from the mixture of the gas from the combustion apparatus 3 and the gas from the scrap preheaters 16, 17 and 18, and, downstream thereof, an induced draft fan 43 to facilitate the gas flow.

Downstream of induced draft fan 43 are sequentially disposed gas scrubbers 44 and wet-type electric precipitator 45, for the removal of malodorous substances and the collection of oil mist present in the gas after preheating of the scrap. Gas scrubber 44 regulates the gas temperature, removes malodorous substances from the exhaust gas, and generates a large quantity of saturated water vapor by evaporation of part of the deodorant solvent solution mingling with and heated by the hot exhaust gas. A wet-type electric precipitator 45 collects oil mist, i.e., very fine oil droplets, that attach themselves to the saturated water vapor and any liquid droplets of the deodorant solution or condensed vapor carried with the exhaust gas.

Figure 5:
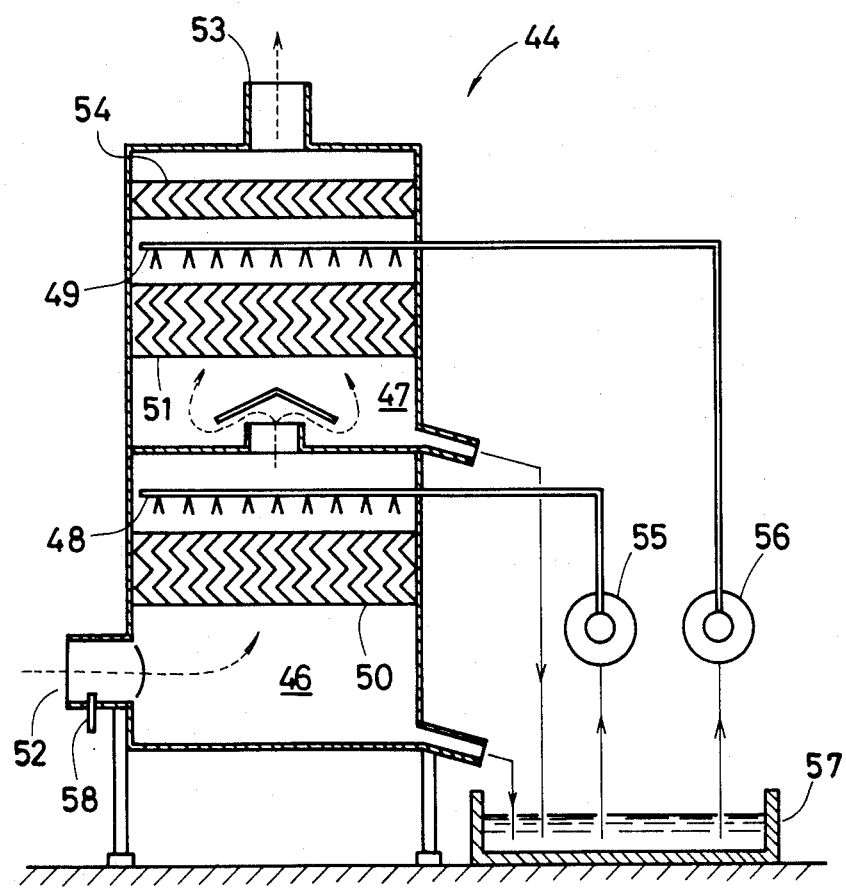
FIG. 5 is a sectional view of a gas scrubber.

One or more of gas scrubbers 44 may be used as necessary, and each would have a circulating pump to circulate the aqueous solution of deodorant solvent therein. Referring to FIG. 5, the gas scrubber 44 comprises a lower chamber 46 and an upper chamber 47, such that the exhaust gas may pass upward from the gas inlet 52 of lower chamber 46 to the gas outlet 53 of the upper chamber. Chambers 45 and 46 are provided with liquid sprinklers 48 and 49 as well as gas-liquid contactors 50 and 51 shaped to have large wetted surfaces and preferably made of fiber-reinforced plastics. Upper chamber 47, especially, has an eliminator 54 in order to separate out water or solvent droplets from the exhaust gas.

Figure 7:
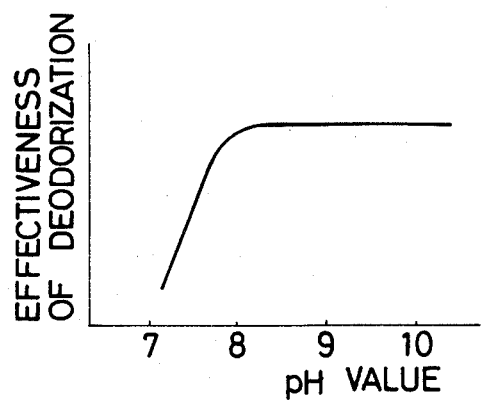
FIG. 7 is a graph (not to scale) depicting the variation of the effectiveness of deodorization versus pH value of the deodorant solution.

Circulating pumps 55 and 56 feed an aqueous solution of deodorant solvent from tank 57 through the two chambers of gas scrubber 44. The deodorant solvent may be a detergent having a high affinity for the malodorous substances present, a solvent into which ozone is blown, or a neutralizer of acid such as an alkali group chemical, preferably sodium hydroxide or sodium carbonate, in a solution having a pH 8 or higher. In practice, with an alkaline-type solution, a pH value in the range 8.0 to 8.5 is sufficient from the viewpoint of cost effectiveness, as is indicated in FIG. 7. The flow rate of deodorant solvent into each gas scrubber is adjusted in response to the inlet gas temperature detected, for example, by a temperature sensor 58 at gas inlet 52 of gas scrubber 44. The deodorant solvent is released inside the scrubber chambers 46 and 47 through sprinklers 48 and 49 respectively, as a fine mist or spray to mix intimately with the exhaust gas flowing thereby.

Figure 6:
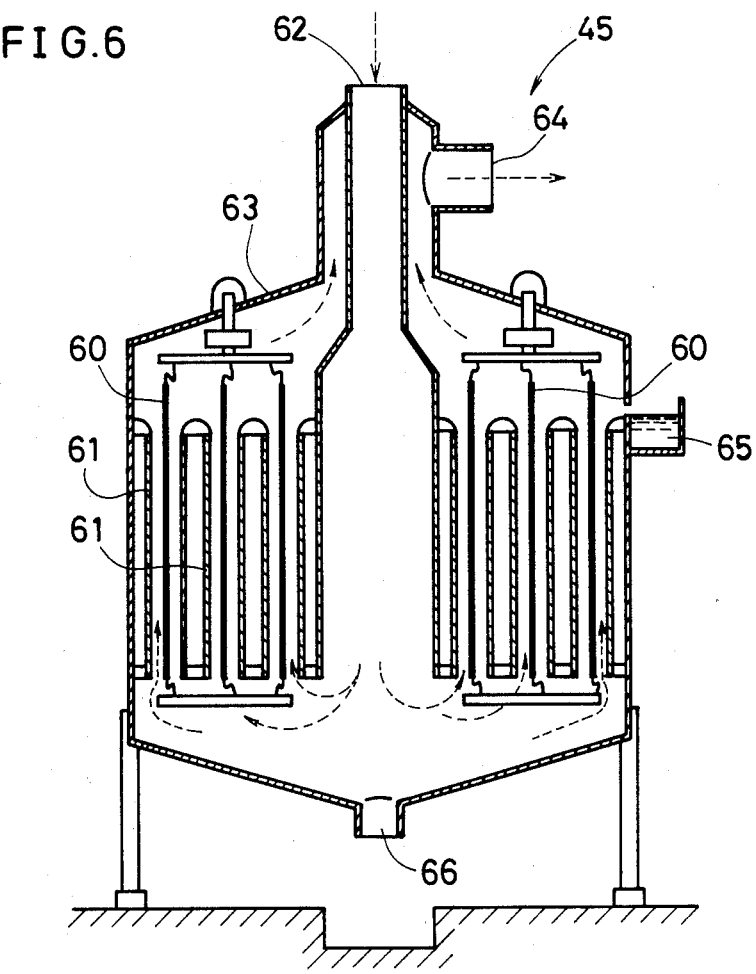
FIG. 6 is a sectional view of a wet-type electric precipitator.

The wet-type electric precipitator 45 collects the fine oil mist suspended in the flowing exhaust gas. As indicated in FIG. 1, it is provided with a water pump 59 for supplying water to flush the electrode surfaces to which the collected oil mist clings. Referring to FIG. 6, precipitator 45 comprises a plurality of discharge electrodes 60, and preferably cylindrically shaped, corresponding collecting electrodes 61 so that the corona discharge of electricity between them generates positive and negative ions in close proximity to discharge electrodes 60. The negative ions negatively charge the saturated water vapor and any solution or condensate droplets present. The very fine droplets of oil in the oil mist present are attracted to and attach themselves to the charged vapor and solution or condensate droplets. As a result, the wet water vapor and oil mist are attracted by electrostatic force towards collecting electrodes 61, whereby the oil mist, saturated vapor and solution or condensate droplets are collected on the surfaces of electrodes 61. A gas inlet 62 and a gas outlet 64, respectively, are provided adjacent to the top of body 63 so that the exhaust gas passes through the cylinders of the collecting electrodes 61 and out through gas outlet 64. Water from a tank 65 is periodically passed over the surfaces of collecting electrode 61 to wash away collected oil mist therefrom and to convey the efflux through the lower opening 66 out of precipitator 45.

Figure 8:
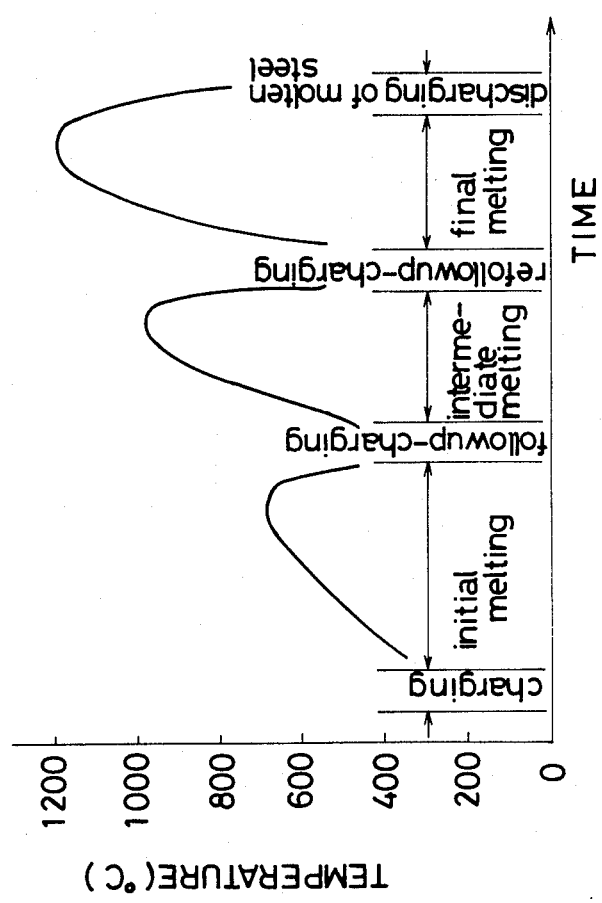
FIG. 8 is a graph (not to scale) depicting the variation of the temperature of the exhaust gas at different times in the operation of a multiply-charged electric steelmaking furnace.
Figure 9:
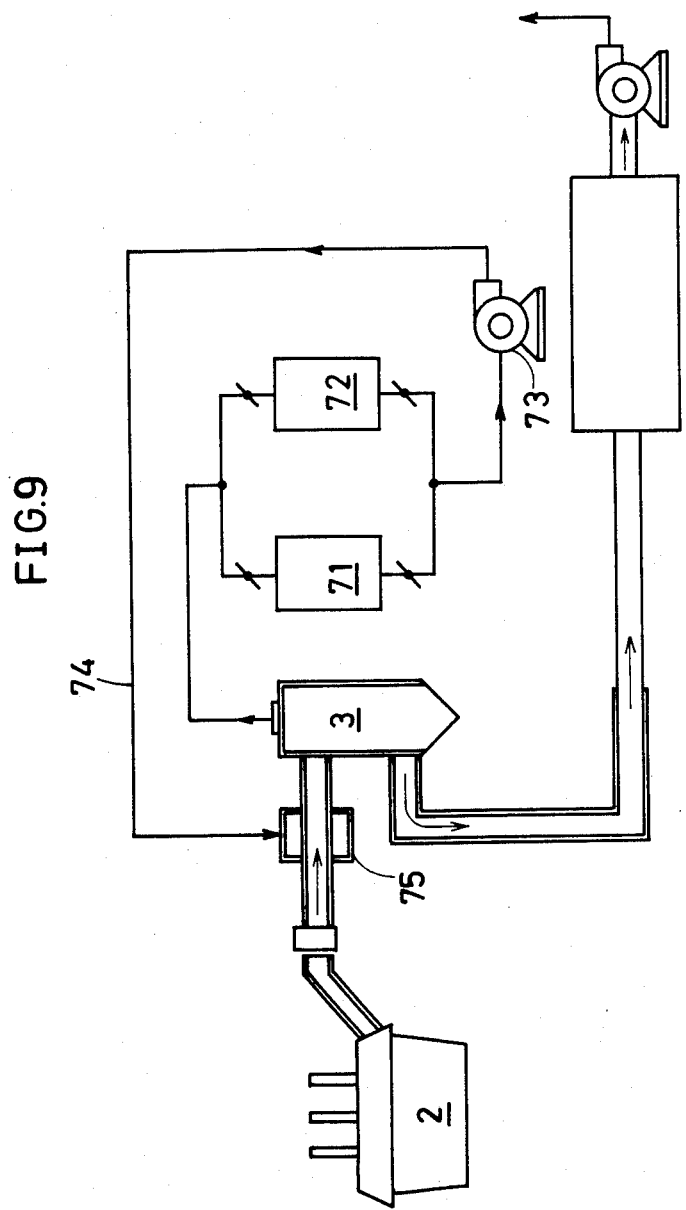
FIG. 9 is a system diagram of a scrap preheating apparatus known in the prior art, which utilizes the exhaust gas from an electric steelmaking furnace to preheat scrap thereof.

The scrap preheating system whose elements have been described above is operated as follows:

Referring to FIG. 1, the scrap preheated in scrap preheaters 16, 17 and 18 is charged into electric furnace 2 and is melted and refined therein. In such refining, the scrap is charged in lots, one after another, in order to raise the melt temperature as indicated in FIG. 8. The dusty, high temperature exhaust gas generated thereby is conveyed by main duct 6 from electric furnace 2, and any combustibles included in the exhaust gas, e.g. CO, are completely burned in combustion apparatus 3 in mixture with fresh air inhaled through the gap adjusting ring 7. Simultaneously, most of the larger particulate matter in the exhaust gas is collected and removed from the bottom of the combustion apparatus.

When scrap preheating is not required, valves 19 through 24 on either side of the scrap preheaters are closed so as to convey all of the exhaust gas through the main duct 6. The exhaust gas from the combustion apparatus 3 is drawn through dust collector 15 by induced draft fan 43, the dust is collected in dust collector 15 and the gas thereafter is released into the atmosphere by an exhaust stack through valve 67. Since the high temperature exhaust gas from electric furnace 2 is completely burned in the combustion apparatus 3, the finally exhausted gas is significantly free of dust and malodorous constituents.

When the scrap, e.g., cutting scrap, pig iron, rolling scrap or iron scrap, or the like, is preheated in preheater 16 by the thermal energy of the exhaust gas generated during the operation of electric furnace 2, valves 19 and 22 are opened and booster fan 25 is actuated in the exhaust duct 28. A flow of exhaust gas corresponding to the suction provided by booster fan 25 is induced from combustion apparatus 3 via subduct 14, the remainder of the exhaust gas from electric furnace 2 going directly into dust collector 15 through main duct 6. The exhaust gas conveyed directly into dust collector 15 is mixed at the confluence point 40 with the exhaust gas that has picked up malodorous contaminants in preheater 16, where it has also experienced a temperature drop of between 100° C. and 300° C. while preheating a charge of scrap. The dust in the mixed exhaust gas is collected by dust collector 15. The mixed exhaust gas at this point is still charged with malodorous constituents so that it cannot be dispersed from an exhaust stack, and it is therfore conveyed to gas scrubber 44 through valve 68.

In gas scrubber 44 a flow of deodorant solvent in aqueous solution, at a rate adjusted to correspond to the gas temperature at its inlet, is circulated so that the temperature of the mixed exhaust gas may drop down by, for example, 80° C., while generating saturated water vapor from the deodorizing solution. The deodrant solution may also be kept at a high temperature and an economical concentration for removal of malodorous constituents from the exhaust gas, even when the temperature of the gas leaving electric furnace 2 during successive charges varies as indicated in FIG. 8. A neutralizer in the deodorant solvent, by chemical action, carries out the removal of malodorous substances uniformly and continuously under regulated deodorizing conditions. The heat in the exhaust gas passing through the scrubber maintains the temperature therein so that the deodorant solvent, and hence the water in the solvent solution evaporating to generate saturated vapor, flows in a fairly constant supply rate therethrough. The oil mist composed of minute oil droplets is not removed by the above-mentioned chemical action of the solvent but, rather, it accompanies or attaches to the saturated water vapor and minute liquid droplets present in the wet vapor and so remains suspended in the exhaust gas as the latter leaves scrubber 44.

The exhaust gas after the removal of malodorous substances is conveyed, together with wet water vapor and attached oil mist, into the wet-type electric precipitator 45, in which a high negative voltage is applied to the discharge electrodes 60 while the collecting electrodes 61 are grounded to cause a strong electrostatic field to be generated around discharge electrodes 60. A corona discharge thus occurs, whereby positive and negative ions are generated in close proximity to the discharge electrodes 60. The positive ions are immediately neutralized at negatively charged electrodes 60, and the negative ions meanwhile charge the wet water vapor, condensate and solution droplets negatively while it passes through the electric field. Hence, oil mist is collected together with the attached water vapor, condensate and solution droplets at collecting electrodes 61. The electrically charged saturated vapor was generated at the stage preceding the electric precipitator 45 for attaching to the fine oil mist. The speed with which such charged particles moved toward electrode 61 increases with the applied electrostatic voltage, and provides a high operational efficiency of the system. The cleaned exhaust gas, free of dust and substantially free of malodorous constituents, is dispersed into the atmosphere through an exhaust stack, and the collected oil mist is separately processed.

The above description is applicable to a case where the exhaust gas introduced directly into dust collector 15 is mixed with an exhaust gas stream that has picked up dust and malodorous pollutants from preheated scrap, e.g., at the confluences 40, 41 and 42. Alternatively, when valve 69 in the main duct 6 is closed, the entire flow of exhaust gas from combustion apparatus 3 will be conveyed to the scrap preheaters 16, 17 and 18. In this case as well, the deodorization of malodorous gas constituents and the collection of oil mist from the exhaust gas are accomplished exactly as described above, and a larger amount of heat energy of the exhaust gas is utilized in order to preheat the scrap. An example of data obtained in carrying out the present invention is as follows: in the refining by a 70 ton capacity electric steelmaking furnace of scrap initially charged by 30 tons, with a follow-up charge of 30 tons and a refollow-up charge of 10 tons, electric power consumption per ton of raw steel is about 415 kilowatt hours. Under these operating conditions, when (1) a case of no preheating of scrap is compared with (2) preheating of all of the scrap by a preheater, a saving in power consumption of 57 kilowatt hours per ton of raw steel processed is obtained, as shown in Table 1 below.

TABLE 1

Comparison of Electric Steelmaking Performance With and Without Scrap Preheating

| | Case (1) (no preheat) | Case (2) (with preheat) |
|---|---|---|
| Heat Recovery Percentage = $\frac{\text{Heat Capacity Given to Scrap}}{\text{Heat Capacity of Exhaust Gas} [\%]} \times 100$ | — | 46.8 |

TABLE 1-continued

Comparison of Electric Steelmaking Performance With and Without Scrap Preheating

| | Case (1) (no preheat) | Case (2) (with preheat) |
|---|---|---|
| Average Temperature of Preheated Scrap (with three charges) [°C.] | — | 420 |
| Power Consumption Per Ton of Raw Steel [KWH/ton] | 415 | 358 |
| Saving of Power Consumption [KWH/ton] | — | 57 |

Moreover, the dust, oil mist and malodorous constituent concentrations in the exhaust gas at the inlet and outlet of dust collector 15, at the outlet of gas scrubber 44, and at the outlet of electric precipitator 45, are as listed in Table 2 below.

TABLE 2

Data on Effectiveness of Pollution Reduction

| | Dust Collector | | Gas Scrubber | Electric Precipitator |
|---|---|---|---|---|
| | Inlet | Outlet | Outlet | Outlet |
| Amount of Dust [g/Nm$^3$] | 15 | 0.05 | 0.04 | 0.001 |
| Amount of Oil Mist [g/Nm$^3$] | 0.45 | 0.15 | 0.13 | 0.008 |
| Odor Concentration* | 9770 | 7500 | 850 | 600 |

*The "odor concentration" in the above table means that the odor is effectively eliminated when the exhaust gas is diluted by uncontaminated air in the cited numerical volumetric multiples It should be apparent from the preceding that this invention may be practiced otherwise than as specifically described and disclosed herein. Modifications, therefore, may be made to the specific embodiments of the apparatus as well as to the steps of the methods disclosed here without departing from the scope of this invention, and are intended to be included within the claims appended below.

What is claimed is:

1. A system for preheating of contaminated scrap to be used in steelmaking, employing exclusively heat from exhaust gas flow carrying dust and unburned combustibles from a furnace, said system comprising:

combustion means for burning said combustibles present in said exhaust gas flow, said combustion means being shaped for separating out a portion of dust particles from said exhaust gas flow contemporaneously with said burning of said combustibles;

scrap preheating means for preheating scrap to be charged into said electric furnace by transfer thereto of heat energy from a predetermined portion of said exhaust gas flow conveyed from said combustion means;

dust collector means for collecting dust from said exhaust gas flow after preheating of scrap in said scrap preheating means;

gas scrubber means for scrubbing malodorous substances generated by said containmants in preheating of said scrap from said gas exhaust flow, wherein said exhaust gas flow is scrubbed with a flow of an aqueous solution of deodorant solvent;

means for detecting the temperature of said exhaust gas flow at the inlet of said gas scrubber means;

means for adjusting the flow rate of said solvent flow in response to said detected exhaust gas flow temperature so as to generate saturated water vapor from said solvent flow to reduce the temperature of said exhaust gas flow flowing through said scrubber means; and wet-type electric precipitator means for collecting residual dust particles and contaminants attached to said saturated water vapor and liquid droplets in said exhaust gas flow.

2. A scrap preheating system, as set forth in claim 1, wherein said combustion means comprises:
- a combustion chamber which decreases the flow velocity of said exhaust gas flow therethrough in order to promote combustion of combustibles contained therein;
- a partition plate to provide a downward and an upward direction to said exhaust gas flow through said combustion chamber to facilitate dust removal therefrom; and
- a dust collection hopper under said combustion chamber.

3. A scrap preheating system, as set forth in claim 1, wherein:
said combustion means comprises a cyclone configuration for decreasing said exhaust gas velocity flow therethrough and generating a spiral vortex of said exhaust gas in order to promote combustion of combustibles contained therein and to facilitate dust removal therefrom; and
a dust collection hopper under said combustion chamber.

4. A scrap preheating system, as set forth in claim 1, wherein said scrap preheating means comprises:
- an upper cover that can be opened in order to charge scrap for preheating;
- a cylindrical body for holding said scrap; and
- a bottom cover of clam shell shape for holding said scrap contained thereabove during preheating, that opens for removal of preheated scrap for charging into said electric furnace.

5. A scrap preheating system, as set forth in claim 1, wherein:
said deodorant solvent used in said gas scrubber is an alkaline substance in aqueous solution of pH 8 or higher.

6. A scrap preheating system, as set forth in claim 1, wherein:
said deodorant solvent used in said gas scrubber is sodium hydroxide in an aqueous solution of pH 8 or more.

7. A scrap preheating system, as set forth in claim 1, wherein:
said deodorant solvent used in said gas scrubber is sodium carbonate in an aqueous solution of pH 8 or higher.

8. A scrap preheating system, as set forth in claim 1, wherein:
said flow of deodorant solvent is regulated in response to exhaust gas temperature sensed by a temperature sensor located upstream of said gas scrubber.

* * * * *